United States Patent
Iwata

(10) Patent No.: US 9,729,923 B2
(45) Date of Patent: *Aug. 8, 2017

(54) ELECTRONIC DEVICE AND RECEIVING SYSTEM

(71) Applicant: Funai Electric Co., Ltd., Osaka (JP)

(72) Inventor: Takahiro Iwata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,732

(22) Filed: Jan. 12, 2016

(65) Prior Publication Data

US 2016/0127774 A1  May 5, 2016

Related U.S. Application Data

(63) Continuation of application No. 13/863,790, filed on Apr. 16, 2013, now Pat. No. 9,269,327.

(30) Foreign Application Priority Data

Jun. 19, 2012 (JP) ................................ 2012-138148

(51) Int. Cl.
| H04N 21/443 | (2011.01) |
| G09G 5/00 | (2006.01) |
| H04N 21/485 | (2011.01) |
| G06F 3/0484 | (2013.01) |
| G09G 3/36 | (2006.01) |
| H04N 5/445 | (2011.01) |

(52) U.S. Cl.
CPC ..... *H04N 21/4436* (2013.01); *G06F 3/04847* (2013.01); *G09G 3/36* (2013.01); *G09G 5/001* (2013.01); *H04N 5/44513* (2013.01); *H04N 5/44543* (2013.01); *H04N 21/485* (2013.01); *G09G 2330/021* (2013.01); *H04N 2005/44521* (2013.01)

(58) Field of Classification Search
CPC .......................... G09G 5/001; H04N 21/4436
USPC ......................... 715/715, 700, 738, 772, 784
See application file for complete search history.

(56) References Cited

U.S. PATENT DOCUMENTS

| 2006/0206734 A1* | 9/2006 | Hori | G06F 1/3218 |
| | | | 713/300 |
| 2010/0082414 A1* | 4/2010 | Shimaya | G06F 1/3218 |
| | | | 705/14.4 |

(Continued)

FOREIGN PATENT DOCUMENTS

| JP | H10-181162 A | 7/1998 |
| JP | 2000-075963 A | 3/2000 |

(Continued)

OTHER PUBLICATIONS

Extended European Search Report in corresponding European Application No. 13163429.7 dated Dec. 4, 2013 (7 pages).

(Continued)

*Primary Examiner* — Kevin Nguyen
(74) *Attorney, Agent, or Firm* — Osha Liang LLP

(57) ABSTRACT

An electronic device includes a device main unit; and a controller that displays on a display visual demonstration of an energy setting of the device main unit, wherein the controller displays, before receiving an operation that enables the energy setting, a state of the device main unit in which the energy setting is enabled.

19 Claims, 12 Drawing Sheets

(56) References Cited

U.S. PATENT DOCUMENTS

2010/0235745 A1    9/2010   Shintani
2011/0047394 A1    2/2011   Sato

FOREIGN PATENT DOCUMENTS

| JP | 2000-259236 A | 9/2000 |
|---|---|---|
| JP | 2006-157183 A | 6/2006 |
| JP | 2006-254185 A | 9/2006 |
| JP | 2007-325092 A | 12/2007 |
| JP | 2009-032351 A | 2/2009 |
| JP | 2010-079025 A | 4/2010 |
| JP | 2011-029949 A | 2/2011 |

OTHER PUBLICATIONS

Office Action in corresponding European Patent Application No. 13 163 429.7 dated Jul. 30, 2014 (7 pages).
Office Action in corresponding Japanese Patent Application No. 2012-138148 dated Oct. 13, 2015 (4 pages).
Extended European Search Report in corresponding European Application No. 17153985.1 dated Mar. 20, 2017 (8 pages).
Office Action in corresponding Japanese Patent Application No. 2012-138148 dated May 9, 2017 (5 pages).

* cited by examiner

ELECTRONIC DEVICE AND RECEIVING SYSTEM

CROSS REFERENCE TO RELATED APPLICATIONS

This application is a Continuation Application of U.S. patent application Ser. No. 13/863,790, filed on Apr. 16, 2013, which claims priority to Japanese Patent Application No. 2012-138148, filed on Jun. 19, 2012. The contents of U.S. patent application Ser. No. 13/863,790 are incorporated herein by reference in their entirety.

FIELD OF TECHNOLOGY

The present invention relates generally to an electronic device and receiving system, and, in particular, relates to an electronic device and receiving system wherein an energy conservation setup can be implemented.

BACKGROUND ART

Conventionally, electronic devices have been known wherein energy conservation setups can be implemented (e.g., Patent Document 1).

This Patent Document 1 discloses a compound electronic device (electronic device) provided with a device main unit and a control unit wherein information is displayed in text regarding drawbacks when running in an electricity-saving mode, when receiving, from a user, an operation pertaining to setting up an electricity saving mode (energy conservation) in the device main unit.

PATENT DOCUMENT

[Patent Document 1] Japanese Unexamined Patent Application Publication 2006-254185

However, it is difficult for the user to envision the state when the electricity-saving mode is selected, through simply displaying in text the drawbacks when running in the electricity-saving mode, as in the compound electronic device of the aforementioned Patent Document 1, and there may be cases wherein the user is unable to understand the state after the electricity-saving mode is setup. In such a case, the electricity-saving mode may be setup without the user having an understanding of the state after the electricity-saving mode is setup.

SUMMARY OF THE INVENTION

One or more embodiments of the present invention provide an electronic device and receiving system wherein the user is able to implement an energy conservation setup after understanding the state after the energy conservation setup.

An electronic device according to one aspect of the present invention is provided with a device main unit and a control unit for performing control that causes a demonstration wherein the state wherein the energy conservation set up is implemented is displayed on a displaying portion in a form that can be understood visually when an operation pertaining to an energy conservation set up for the device main unit portion is received from a user.

In the electronic device according to one or more embodiments, the provision of the control unit for performing control so as to cause a demonstration, in a form that can be understood visually, so as to display, on a display unit, the state wherein the energy conservation setup is implemented when an operation pertaining to an energy conservation setup for the device main unit is received from a user makes it possible to envision easily, through the demonstration, the state wherein the energy conservation setup is implemented, thus making it possible for the user to understand the energy conservation setup. This enables the user to perform the energy conservation setup after understanding the state after the energy conservation setup.

In the electronic device according to one or more embodiments, the control unit is configured so as to perform an inquiry to the user as to whether or not to implement the energy conservation setup, after having displayed on the displaying portion, through a demonstration, the state wherein the energy conservation setup is executed. Such a configuration enables the user to respond to the inquiry as to whether or not to implement the energy conservation setup after understanding visually, through the demonstration, the state wherein the energy conservation setup is implemented.

In the electronic device according to one or more embodiments, the energy conservation setup energy conservation settings are possible for a plurality of items, and the control unit is configured so as to perform control to cause a demonstration, in a form that can be understood visually, of the state wherein the energy conservation settings are executed for each individual item of the plurality of items. Such a configuration enables the user to perform the energy conservation setup for each of the individual items after understanding the individual items.

In one or more embodiments, the displaying portion includes an external displaying portion that is connected to the device main unit or a displaying portion that is provided in the device main unit, an Energy Conservation Setup Menu screen that includes all of the plurality of items is displayed on the displaying portion, and the control unit is configured so as to perform control so as to display on the displaying portion, through a demonstration, the state wherein the energy conservation setting for an item selected from among the plurality of items displayed on the Energy Conservation Setup Menu screen is implemented. Such a configuration enables selection of a desired item from the plurality of items that are displayed as a group on the external displaying portion that is connected to the device main unit or on the displaying portion that is provided in the device main unit, thus enabling an improvement in the operability when performing the energy conservation setup. Moreover, this enables the display of a demonstration, on the external displaying portion that is connected to the device main unit or on the displaying portion that is provided in the device main unit, of the state wherein the energy conservation setup is implemented, thus enabling the user to easily understand visually the energy conservation setup.

In one or more embodiments, in a configuration wherein the displaying portion is configured to include an external displaying portion that is connected to the device main unit or a displaying portion that is provided in the device main unit, the control unit is configured so as to perform control so as to display, on the displaying portion, information regarding the electric power that is saved when the energy conservation setting is implemented for each of the plurality of items when the Energy Conservation Setup Menu screen that includes all of the plurality of items is displayed on the displaying portion. Such a configuration enables the electricity-saving effect to be increased easily through selecting the items with a large savings in electric power while comparing the plurality of items on the Energy Conservation Setup Menu screen.

In one or more embodiments, in a configuration wherein the displaying portion is configured to include an external displaying portion that is connected to the device main unit or a displaying portion that is provided in the device main unit, a remote control that includes an Energy Conservation Setup Menu button for switching to the Energy Conservation Setup Menu Screen is further provided, where the device main unit includes a remote control sensor able to receive a remote control signal, and the control unit is configured so as to perform control so as to switch the screen that is displayed on the displaying portion to the Energy Conservation Setup Menu screen when the remote control sensor has received a signal when the Energy Conservation Setup Menu button is pressed by the user. Such a configuration enables displaying of the Energy Conservation Setup Menu screen on the displaying portion by merely pressing the Energy Conservation Setup Menu button on the remote control, enabling an improvement in the operability (convenience) when performing the energy conservation setup.

In an electronic device according to one or more embodiments, the control unit is configured so as to perform control so as to display information regarding the electric power saved and the electric power costs that will be saved when the energy conservation setup is implemented when displaying, through a demonstration on the displaying portion, the state wherein the energy conservation setup is implemented. Such a configuration enables easy understanding of information regarding the electric power saved and the electric power costs that will be saved the energy conservation setup is implemented while confirming, through the demonstration, the state wherein the energy conservation setup has been implemented.

In the electronic device according to one or more embodiments, an external displaying portion is connected to the device main unit, the device main unit includes an information displaying portion able to display information of the device main unit, and the control unit is configured so as to perform control so as to demonstrate, in a form that can be understood visually, the state wherein the energy conservation setup has been implemented, using the information displaying portion, while displaying a setup screen for the energy conservation setup of the information displaying portion on the external displaying portion. In such a configuration, a demonstration of after the energy conservation setup has been implemented using the information displaying portion itself when performing the energy conservation setup of the information displaying portion, thus enabling the user to envision more easily the state wherein the energy conservation setup has been implemented, and, consequently, enabling the user to understand easily the state after the energy conservation setup as well.

A receiving system according to a second aspect of the present invention is provided with a receiving device that includes a receiving portion for receiving a broadcast signal, a receiving device main unit, and a control unit, and provided with an external display device connected to the receiving portion, where the control unit is configured so as to perform control so as to demonstrate, in a form that can be understood visually, the state wherein an energy conservation setup is implemented, through displaying on the external display device or through causing the receiving device to operate, when an operation pertaining to an energy conservation setup of the receiving device main unit is received from a user.

In the receiving system according to one or more embodiments, the provision of the control unit for performing control so as to demonstrate, in a form that can be understood visually, the state wherein the energy conservation setup has been implemented, through displaying on the external display device or through causing the receiving device to operate, when an operation pertaining to an energy conservation setup of the receiving device main unit is received from a user, enables the state wherein the energy conservation setup has been implemented to be envisioned easily through the demonstration, thus enabling the user to understand the energy conservation setup. Consequently, this enables the energy conservation setup to be performed by the user based on an understanding regarding the state after the energy conservation setup. Moreover, this enables the demonstration of the state wherein the energy conservation setup has been implemented to be either performed by displaying on the external display device or performed on the receiving device, thus enabling the user to understand the energy conservation setup easily.

One or more embodiments of the present invention enable the user to perform the energy conservation setup based on an understanding regarding the state after the energy conservation setup.

DETAILED DESCRIPTION OF THE INVENTION

A configuration of a receiving system 100 according to embodiments of the present invention will be explained below in reference to FIG. 1 through FIG. 19.

Figure 1:
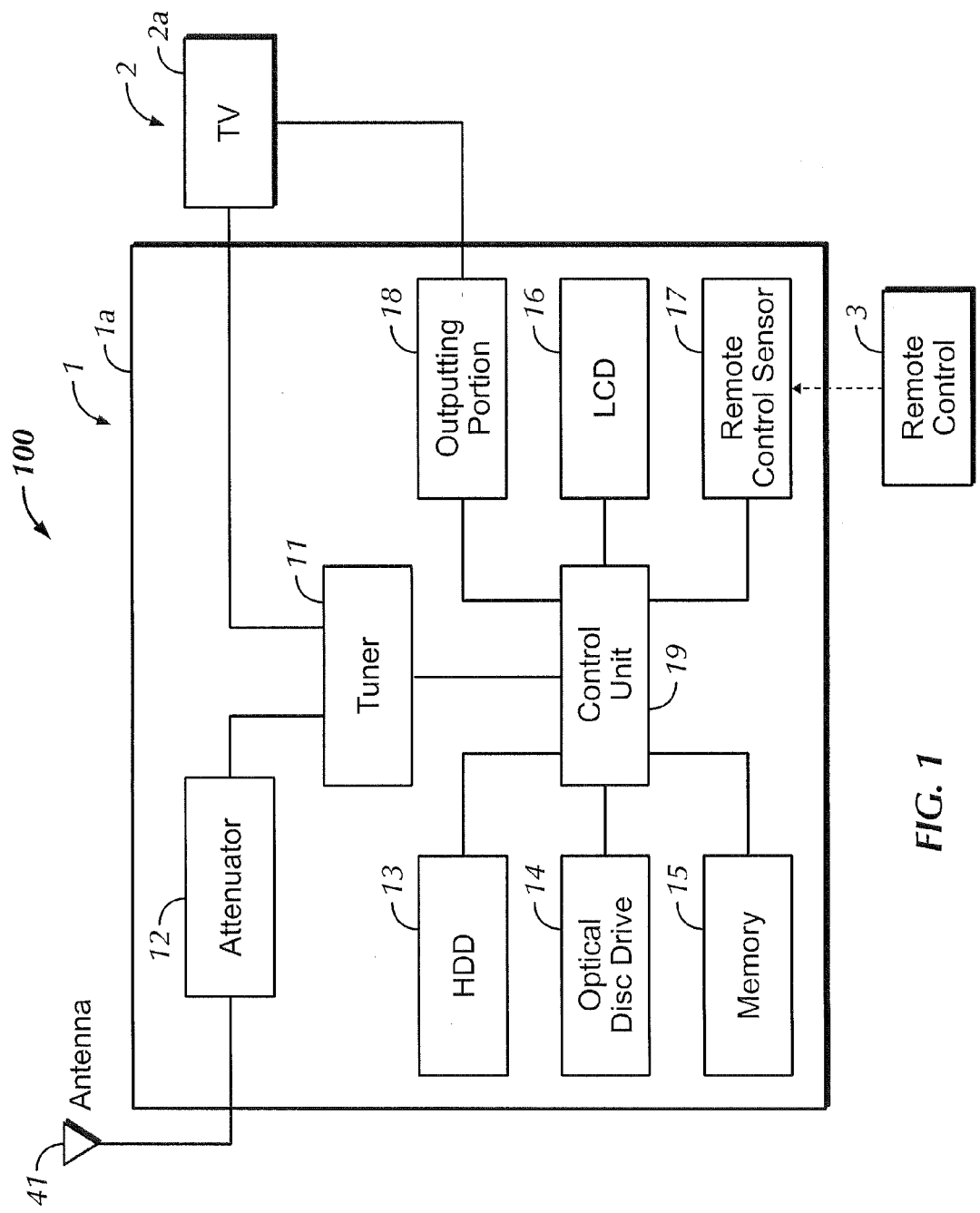
FIG. 1 is a block diagram illustrating a configuration of a receiving system according to one embodiment of the present invention.
Figure 2:
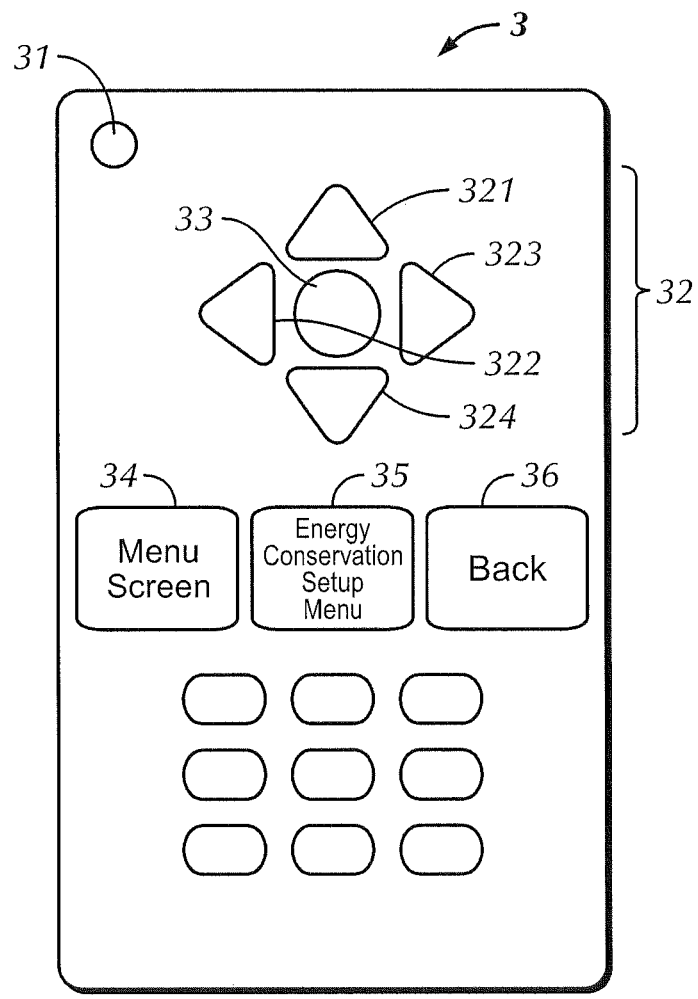
FIG. 2 is a diagram illustrating a remote control of a BD recorder in a receiving system according to one embodiment of the present invention.

The receiving system 100, as illustrated in FIG. 1, is provided with a BD (Blu-ray disc) recorder 1 and a TV (television) device 2. The BD recorder 1 is provided with a BD recorder main unit 1a and a remote control 3. Note that the BD recorder 1 is one example of the "electronic device" and the "receiving device" in the present disclosure. Moreover, the BD recorder main unit 1a is one example of the "device main unit" and the "receiving device main unit" of the present disclosure. Furthermore, the TV device 2 is one example of an "external display device" according to the present disclosure.

The BD recorder main unit 1, as illustrated in FIG. 1, is provided with a tuner 11, an attenuator 12 for attenuating the TV broadcast radio signal to an appropriate level, an HDD 13, and an optical disc drive 14. Moreover, the BD recorder main unit 1 is provided with a memory 15, an LCD 16, a remote control sensor 17, an outputting portion 18, and a control unit 19. Note that the tuner 11 is an example of a "receiving portion" according to the present disclosure. Moreover, the LCD 16 is one example of an "information displaying portion" according to the present disclosure.

Furthermore, the BD recorder 1 has three power modes: a power ON mode, a power OFF mode, and an energy conservation mode. The power ON mode is a mode for a state wherein power is supplied to the BD recorder 1 in a normal state. The power OFF mode is a mode for a state wherein the main power is turned OFF, and no power whatsoever is supplied to the BD recorder 1. Moreover, the energy conservation mode is a mode where a portion of the functions of the BD recorder 1 are limited, to reduce the power supplied within the BD recorder main unit 1a to less than that of the power ON mode. Note that the BD recorder 1 is configured so as to shift to the energy conservation mode through pressing the Power button 31 of the remote control 3.

The BD recorder 1 has a quick start setup function that can switch from the energy conservation mode to the power ON mode rapidly. When the quick start setting is set to ON, then the power that is required to perform the quick start is supplied to the electronic compliments such as the tuner 11 and the attenuator 12 of the BD recorder.

The tuner 11 is configured so as to receive a TV broadcast through an antenna 41. The tuner 11 is connected to the TV device 2 through a cable. Moreover, the tuner 11 has an antenna-through output function to enable viewing, on the TV device 2, of a TV broadcast received by the tuner 11 when the BD recorder 1 is switched into the energy conservation mode.

The attenuator 12 is configured so as to be able to attenuate the TV broadcast radio signal to an appropriate level to enable crisp viewing of video from a TV broadcast.

The HDD 13 is configured to enable recording of a TV broadcast received through the tuner 11. Moreover, the optical disc drive 14 is configured to enable reading of data from the BD. Furthermore, the optical disc drive 14 is configured to enable writing of data to the BD.

The memory 15 is a rewritable non-volatile memory. The memory 15 is configured so as to store various types of information used by the BD recorder main unit 1a.

Figure 6:
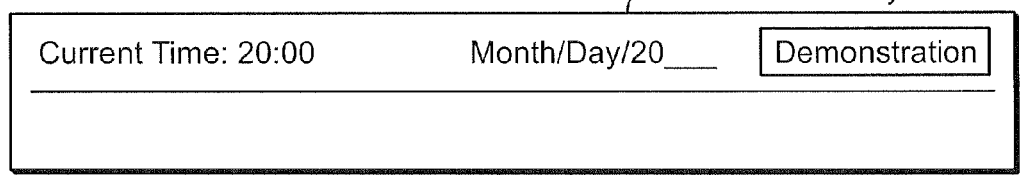
FIG. 6 is a diagram illustrating a state wherein the LCD energy conservation setting of the BD recorder is ON in the receiving system according to one embodiment of the present invention.

The LCD 16 is configured to enable display of information from the BD recorder main unit 1a. Information pertaining to playback and recording of the BD recorder 1, the current time, and the like, are displayed on the LCD 16 (FIG. 6).

The remote control sensor 17 is configured so as to be able to receive the signal of the remote control 3. The remote control sensor 17 is configured so as to forward information regarding the signals received to the control unit 19.

The outputting portion 18 is configured so as to forward, to the TV device 2, information regarding the video that is played back by the BD recorder main unit 1a.

The control unit 19 is configured so as to control the overall operation of the BD recorder 1. The control unit 19 will be explained in detail below.

Figures 3, 4:
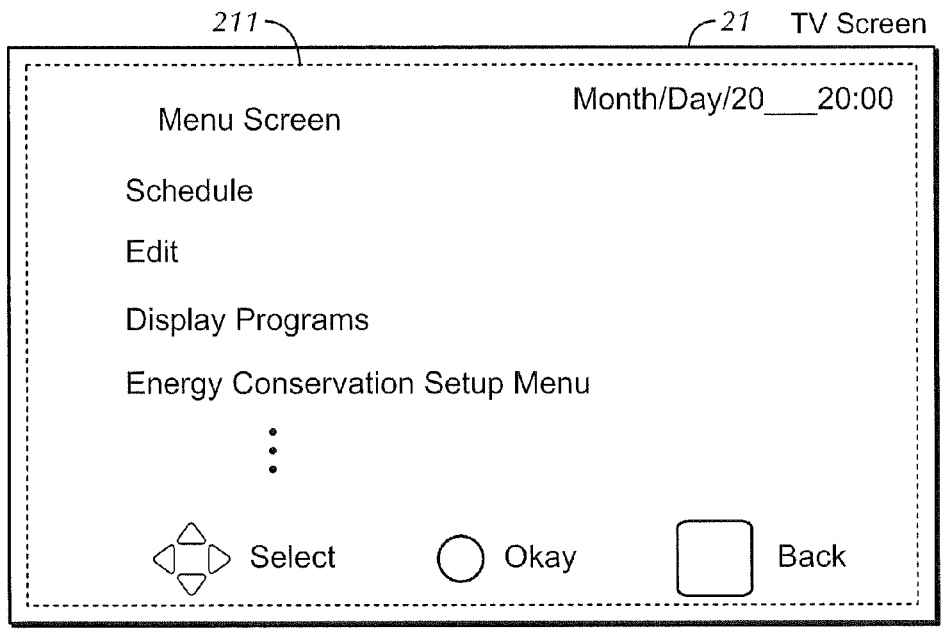
FIG. 3 is a diagram illustrating a Menu screen of a receiving system according to one embodiment of the present invention.
FIG. 4 is a diagram illustrating an Energy Conservation Setup Menu screen of a receiving system according to one embodiment of the present invention.

The TV device 2, as illustrated in FIG. 1, is provided with a TV device main unit 2a and a displaying portion 21 (FIG. 3 and FIG. 4). The displaying portion 21 is configured so as to be able to display video of a TV broadcast that is received by the tuner 11 of the BD recorder 1, information pertaining to the settings of the BD recorder 1, and so forth.

Here, in the present embodiment, the remote control 3 is provided with a Power button 31, a + button 32, and an Okay button 33. Moreover, the remote control 3 is provided with a Menu Screen button 34, an Energy Conservation Setup Menu button 35, and a Back button 36.

The Power button 31 has the function of a command for sending, from the remote control 3 to the TV device 2, a signal for switching the BD recorder 1 to the power ON mode or the energy conservation mode. The + button 32 includes an Up button 321, a Left button 322, a Right button 323, and a Down button 324. The + button 32 is used when selecting a desired item from the displaying portion 21 of the TV device 2. The Okay button 33 has a function for locking in an item that has been selected.

The Menu Screen button 34 has a function for switching the screen that is displayed on the displaying portion 21 of the TV device 2 to a Menu screen 211 (FIG. 3). The Energy Conservation Setup Menu button 35 has a function for switching the screen that is displayed on the displaying portion 21 of the TV device 2 to the Energy Conservation Setup Menu screen 212 (FIG. 4). The Back button 36 has a function for switching the screen that is displayed on the displaying portion 21 to the viewing screen (the screen that displays the broadcast signal that is received).

The configuration of the control unit 19 in the BD recorder 1 of the receiving system 100 according to one embodiment according to the present invention will be explained in detail next in reference to FIG. 3 and FIG. 4.

As illustrated in FIG. 3, the control unit 19 is configured so as to perform control so as to display the Menu screen 211 on the displaying portion 21 of the TV device 2. Moreover, the control unit 19 is configured so as to perform control so as to switch to the Energy Conservation Setup Menu screen 212 when the Energy Conservation Setup Menu item is selected in the Menu screen 211. Furthermore, the control unit 19 is configured so as to perform control so as to switch to the Energy Conservation Setup Menu screen 212 when the Energy Conservation Setup Menu button 35 (FIG. 2) is pressed when any given screen (such as the viewing screen) is displayed on the displaying portion 21. That is, the control unit 19 is configured so as to perform control so as to switch to the Energy Conservation Setup Menu screen 212 when the remote control sensor 17 has received a signal that the Energy Conservation Setup Menu button 35 has been pressed.

As illustrated in FIG. 4, the control unit 19 is configured so as to perform control so as to display on the displaying portion 21 an Energy Conservation Setup Menu screen 212 that groups together a plurality of setting items pertaining to energy conservation settings. Specifically, the control unit 19 is configured so as to perform control so as to display, together as a group, in the Energy Conservation Setup Menu screen 212, the current states of the energy conservation settings for the respective individual setting items 511 through 515 included in the plurality of setting items, together with information pertaining to the amounts of electricity consumption that would be saved when the energy conservation settings are OFF, and the amounts of electricity costs that would be saved when the energy conservation settings are OFF. Note that the individual items 511 through 515 are, respectively, the BD recorder LCD setting, the antenna-through output setting, the attenuator power setting, the quick start setting, and the optical disc operation setting. Moreover, the energy conservation settings can be performed individually for the respective functions corresponding to the individual items 511 through 515.

Specifically, when the energy conservation setting is ON for the BD recorder LCD setting, the display function for the BD recorder LCD is enabled. Furthermore, when the energy conservation setting is OFF for the BD recorder LCD setting, the BD recorder LCD display function is disabled. Moreover, for the antenna-through output setting, when the energy conservation setting is ON the antenna-through output function is enabled. When, for the antenna-through output setting, the energy conservation setting is OFF, the antenna-through output function is disabled. Moreover, for the attenuator power setting, when the energy conservation setting is ON, the attenuator power function is enabled. When, for the attenuator power setting, the energy conservation setting is OFF, the attenuator power function is disabled. Furthermore, when, for the quick start setting, the energy conservation setting is ON, the quick start function is enabled. When, for the quick start setting the energy conservation setting is OFF, the quick start function is disabled. Furthermore, when, for the optical disc operation setting, the energy conservation setting is ON, the optical disc operation function is enabled. When, for the optical disc operation setting, the energy conservation setting is OFF, the optical disc operation function is disabled.

Furthermore, the control unit 19 is configured so as to perform the energy conservation setup (energy setup) for the plurality of items that are displayed as a group. Moreover, the control unit 19 is configured so as to set the energy conservation settings (energy settings) individually for each of the individual items 511 through 515 that are selected from the plurality of items that are displayed as a group. The control unit 19 is configured so as to perform control so as to display, on the displaying portion 21, information regarding the electric power that would be saved when the individual energy conservation settings, of the plurality of items, are implemented when the Energy Conservation Setup Menu screen 212, which includes a plurality of items as a group, is displayed on the displaying portion 21.

The control unit 19 is configured so as to perform control so as to demonstrate, in a form that can be understood visually, the state wherein the energy conservation setup has been implemented, when performing the energy conservation setup for the BD recorder main unit 1a. The control unit 19 is configured so as to perform control so as to demonstrate, in a state that can be understood visually, the states wherein the energy conservation settings for the individual items 511 through 515, of the plurality of items, have been implemented individually. The demonstration is executed either through implementing, on the recorder main unit 1a itself, the state wherein the energy conservation setup is implemented, or through displaying, on the displaying portion 21, a video (for example, in the form of a movie) of the BD recorder main unit 1a in a state wherein the energy conservation setting is implemented.

Figure 5:
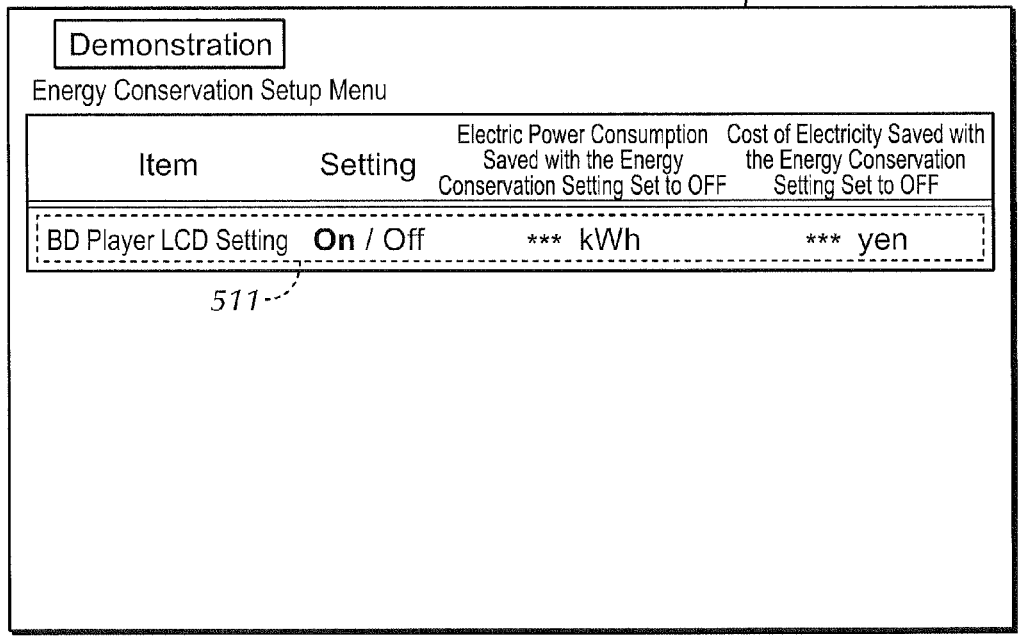
FIG. 5 is a diagram illustrating a displaying portion in a state wherein the LCD energy conservation setting of the BD recorder is ON in the receiving system according to one embodiment of the present invention.
Figure 7:
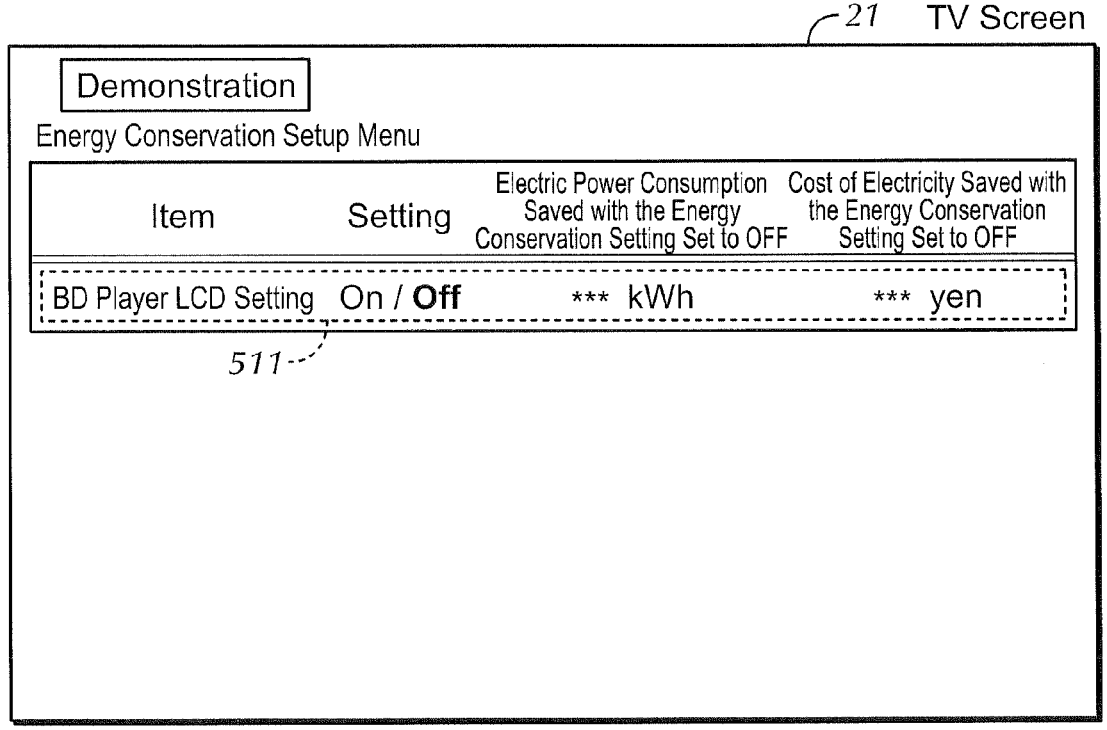
FIG. 7 is a diagram illustrating a displaying portion in a state wherein the LCD energy conservation setting of the BD recorder is OFF in the receiving system according to one embodiment of the present invention.
Figure 8:
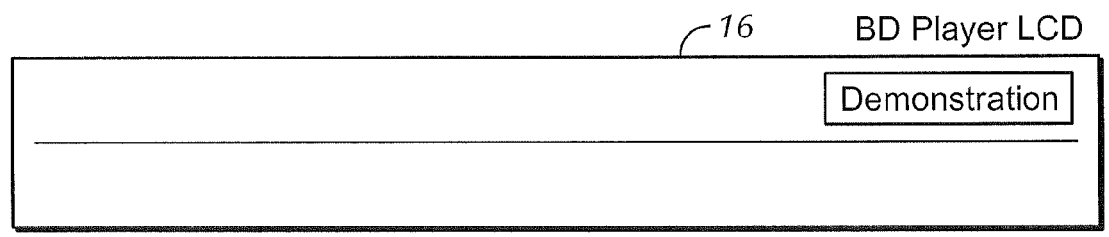
FIG. 8 is a diagram illustrating a demonstration in a state wherein the LCD energy conservation setting of the BD recorder is OFF in the receiving system according to one embodiment of the present invention.
Figure 9:
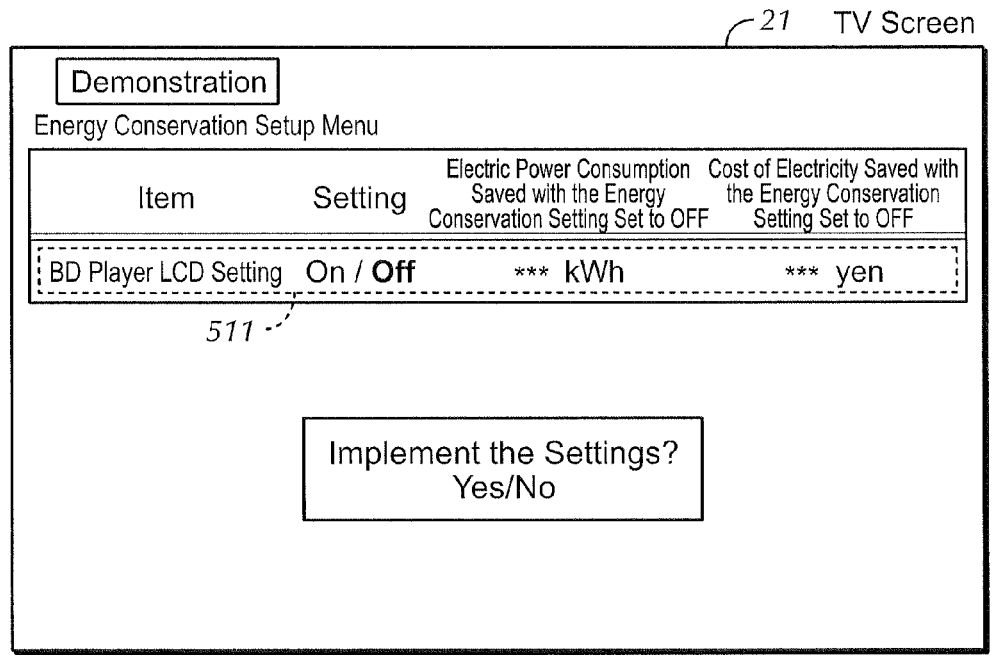
FIG. 9 is a diagram illustrating a query regarding whether or not to implement an LCD energy conservation setting of the BD recorder in the receiving system according to one embodiment of the present invention.

For example, if performing the energy conservation setup for the LCD 16 of the BD recorder 1, then, as illustrated in FIG. 5 through FIG. 8, the control unit 19 is configured so as to perform control so as to demonstrate, in a form that can be understood visually, the state wherein an energy conservation setup is implemented using the LCD 16, while displaying the setup screen for the energy conservation settings for the LCD 16 on the displaying portion 21 of the TV device 2. Specifically, as illustrated in FIG. 5, the control unit 19 displays, on the displaying portion 21, a setup screen for the energy conservation setting wherein the energy conservation setting for the LCD 16 of the BD recorder 1 is ON. In this case, the control unit 19, as illustrated in FIG. 6, places the LCD 16 in the state wherein the energy conservation setting for the LCD setup is ON. Moreover, as illustrated in FIG. 7, the control unit 19 displays, on the displaying portion 21, a setup screen for the energy conservation setting wherein the energy conservation setting of the LCD 16 of the BD recorder 1 is OFF if the user has switched the energy conservation setting for the LCD 16 of the BD recorder 1 from ON to OFF by operating the remote control 3. In this case, the control unit 19 performs a demonstration, as illustrated in FIG. 8, with the LCD 16 in the state wherein the energy conservation setting of the LCD 16 of the BD recorder 1 has been set to OFF.

Figure 10:
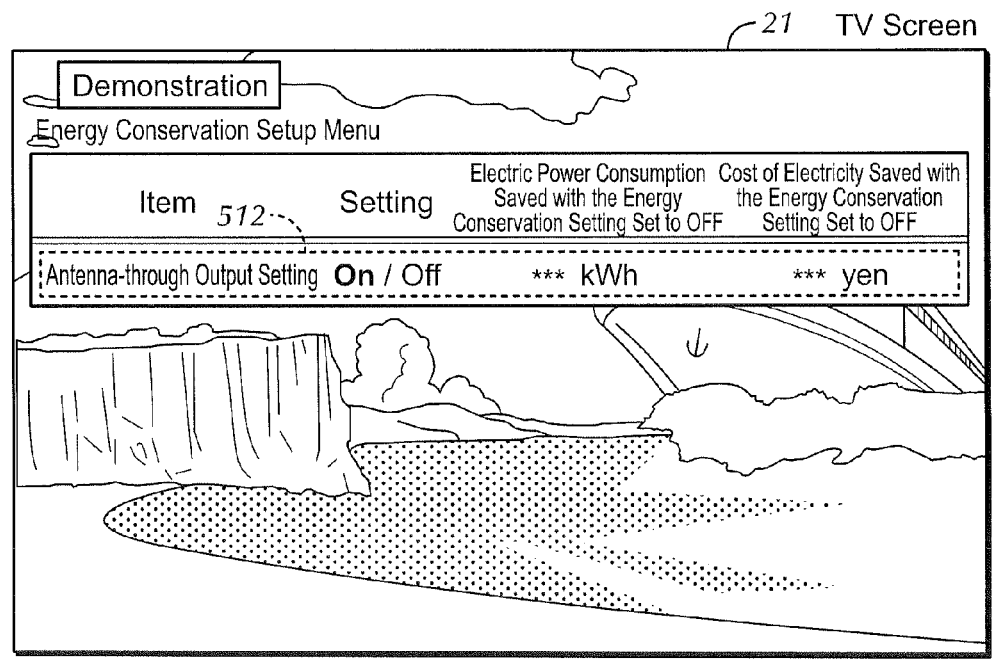
FIG. 10 is a diagram illustrating a displaying portion in a state wherein the antenna-through output setting of the energy conservation setting of the BD recorder is ON in the receiving system according to one embodiment of the present invention.
Figure 11:
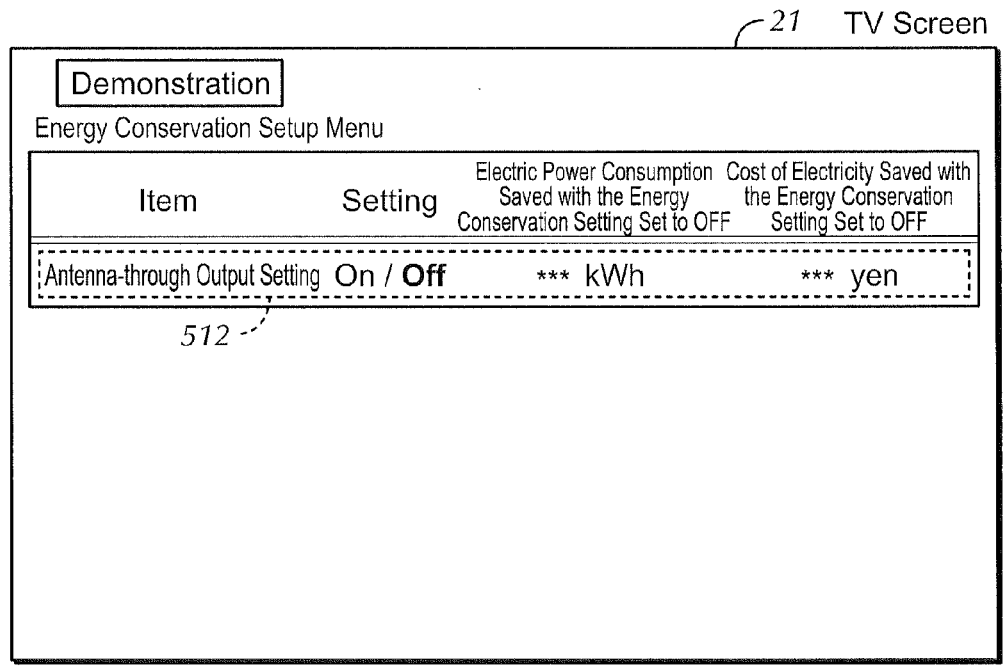
FIG. 11 is a diagram of a demonstration, displayed on the displaying portion, of a state wherein the antenna-through output setting of the energy conservation setting of the BD recorder is OFF in the receiving system according to one embodiment of the present invention.

Moreover, in the case of the energy conservation setup for the antenna-through output, as illustrated in FIG. 10, the control unit 19 displays on the displaying portion 21 the state wherein the energy conservation setting for the antenna-through output has been turned ON. The control unit 19, as illustrated in FIG. 11, performs a demonstration in a form that displays on the displaying portion 21 the state wherein the energy conservation setting for the antenna-through output has been turned OFF when the energy conservation setting for the antenna-through output has been switched from ON to OFF by the user operating the remote control 3. In this case, a demonstration is displayed on the displaying portion 21 for a case wherein the video of the television broadcast cannot be viewed because the antenna-through output function is curtailed. Specifically, when the energy conservation setting for the antenna-through output is ON, the video of the TV broadcast that is displayed on the displaying portion 21 ceases to be shown on the displaying portion 21 through the energy conservation setting for the antenna-through output being set to OFF.

Figure 13:
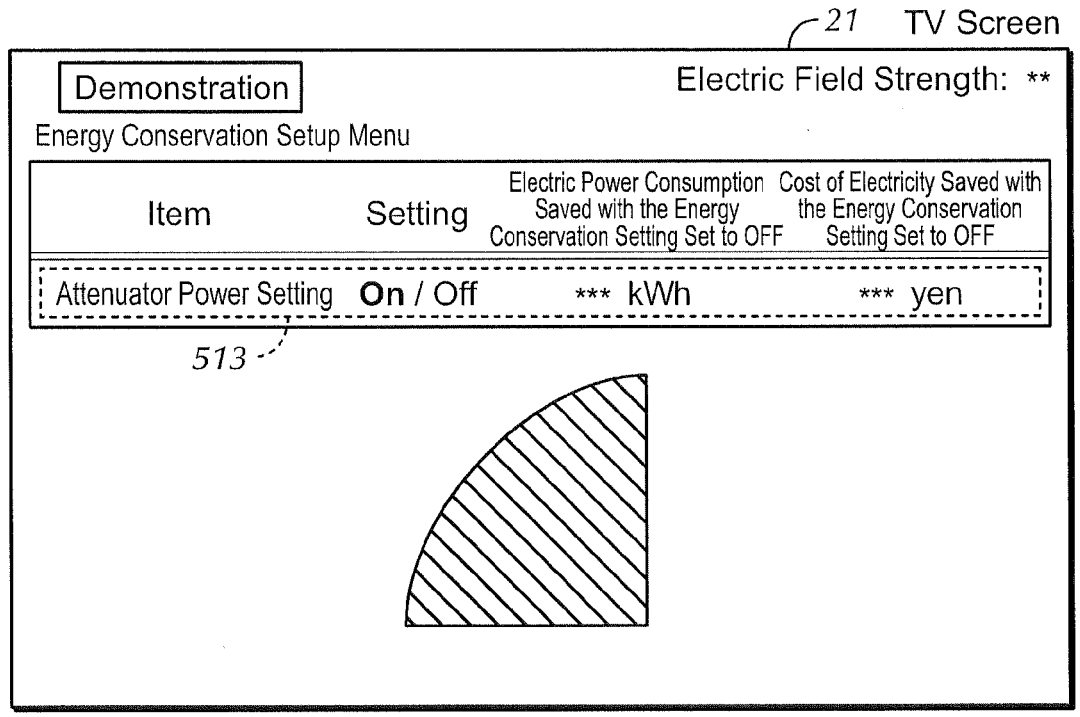
FIG. 13 is a diagram illustrating a displaying portion in a state wherein the antenna-through output setting of the energy conservation setting of the BD recorder is ON in the receiving system according to one embodiment of the present invention.
Figure 14:
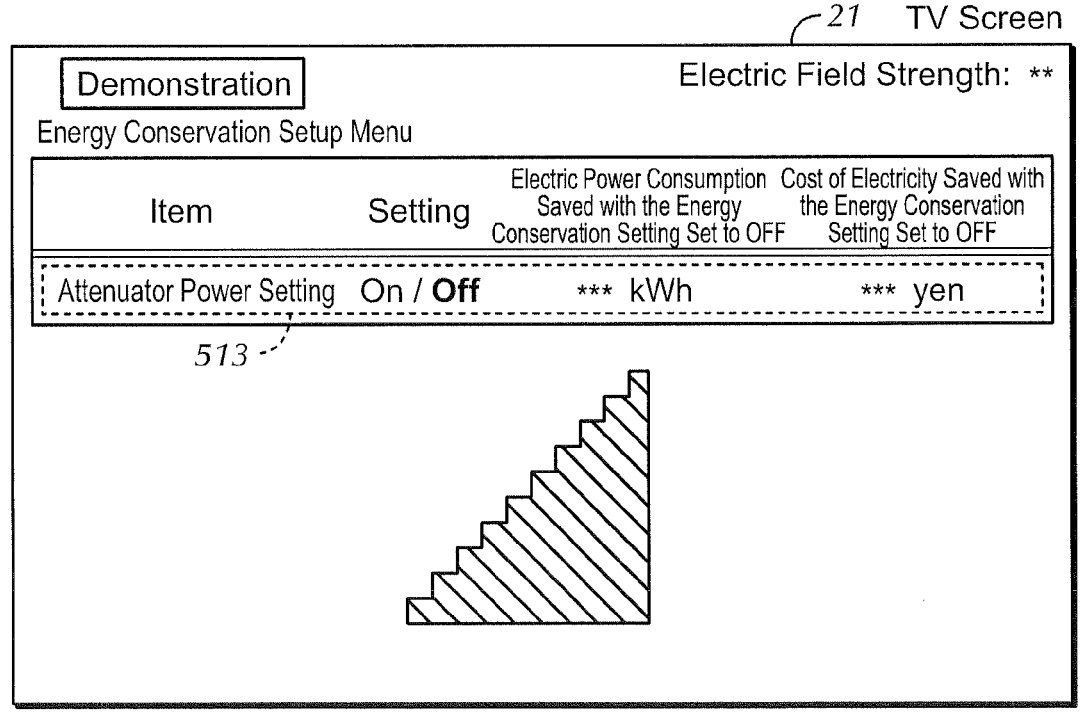
FIG. 14 is a diagram of a demonstration, displayed on the displaying portion, in a state wherein the antenna-through output setting of the energy conservation setting of the BD recorder is OFF in the receiving system according to one embodiment of the present invention.
Figure 15:
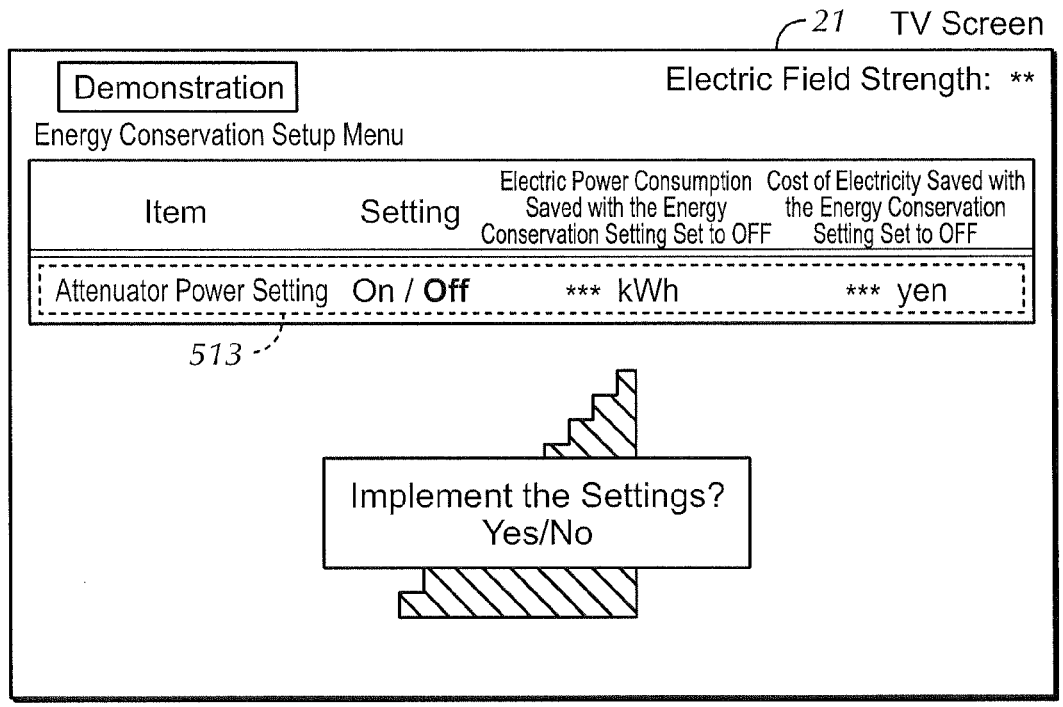
FIG. 15 is a diagram illustrating a query regarding whether or not to implement an attenuator power setting of the BD recorder in the receiving system according to one embodiment of the present invention.

Furthermore, when performing the setup for the attenuator power, as illustrated in FIG. 13, the control unit 19 displays on the displaying portion 21 the state wherein the setting for the attenuator power is ON (the energy conservation setting is ON). The control unit 19 performs a demonstration, as illustrated in FIG. 14, on the displaying portion 21 in a form wherein the state wherein the setting for the attenuator power has been turned OFF (the energy conservation setting is OFF) when the setting for the attenuator power has been switched from ON to OFF by the user operating the remote control 3. In this case, a demonstration is displayed on the displaying portion 21 of a state wherein the video from the TV broadcast is not clear due to curtailing of the function of the attenuator 12. Specifically, the video of the TV broadcast that is displayed in clear focus when the setting for the attenuator power is ON is displayed in a state wherein the focus is not sharp due to the setting of the attenuator power being set to OFF. Furthermore, as illustrated in FIG. 13 through FIG. 15, the electric field strengths for the selected attenuator power settings are displayed on the displaying portion 21.

Figure 16:
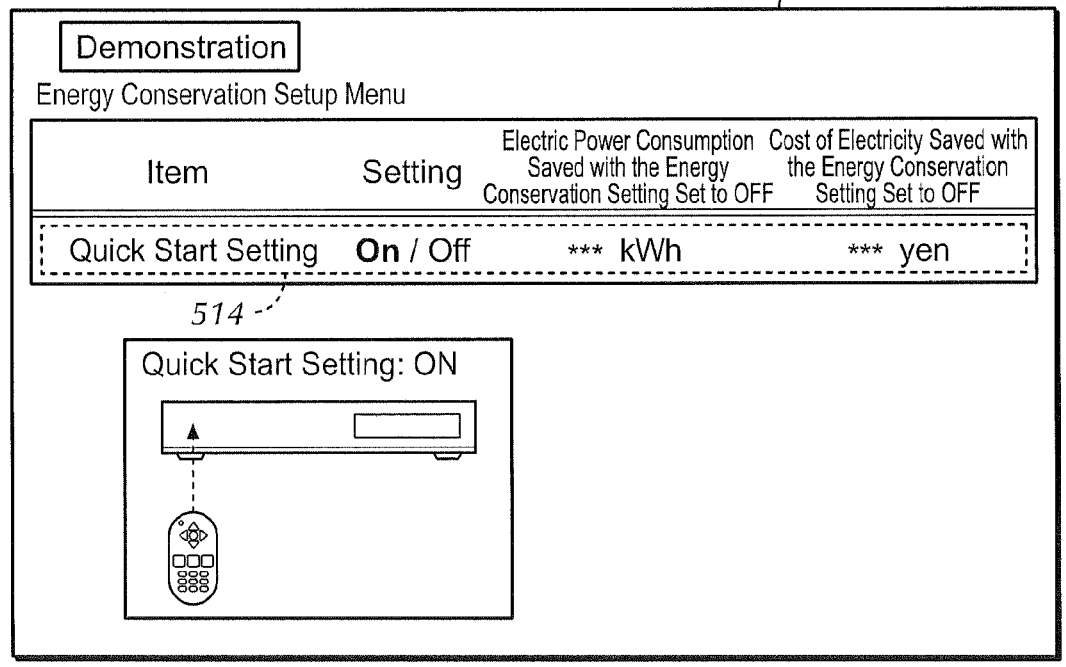
FIG. 16 is a diagram illustrating a displaying portion in a state wherein the quick start setting of the energy conservation setting of the BD recorder is ON in the receiving system according to one embodiment of the present invention.
Figure 17:
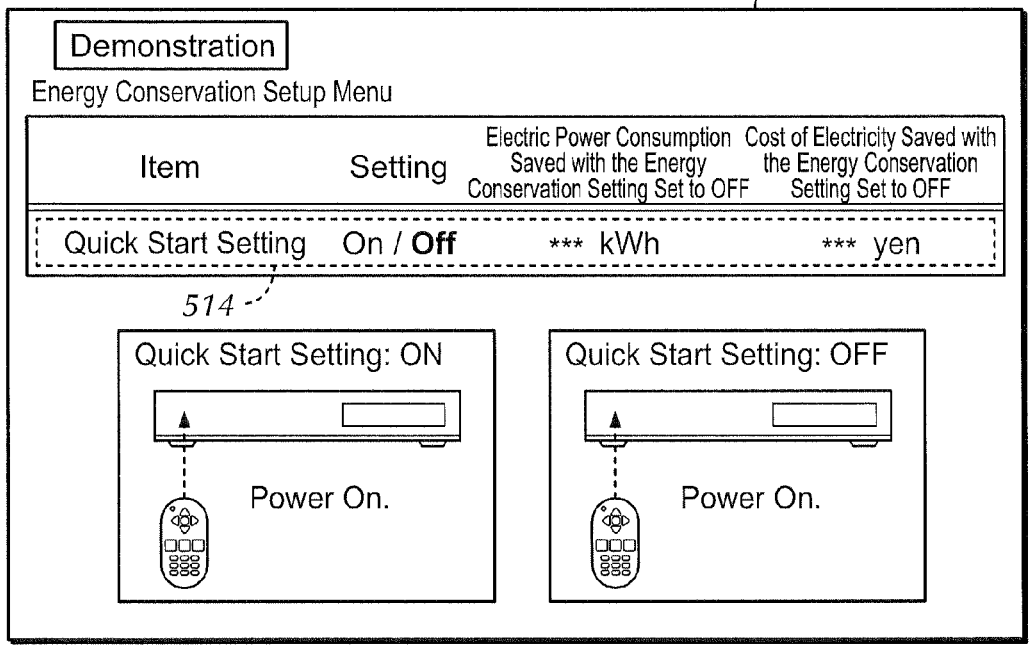
FIG. 17 is a diagram illustrating a displaying portion in a state wherein the demonstration has been started with the quick start setting of the energy conservation setting of the BD recorder OFF in the receiving system according to one embodiment of the present invention.
Figure 18:
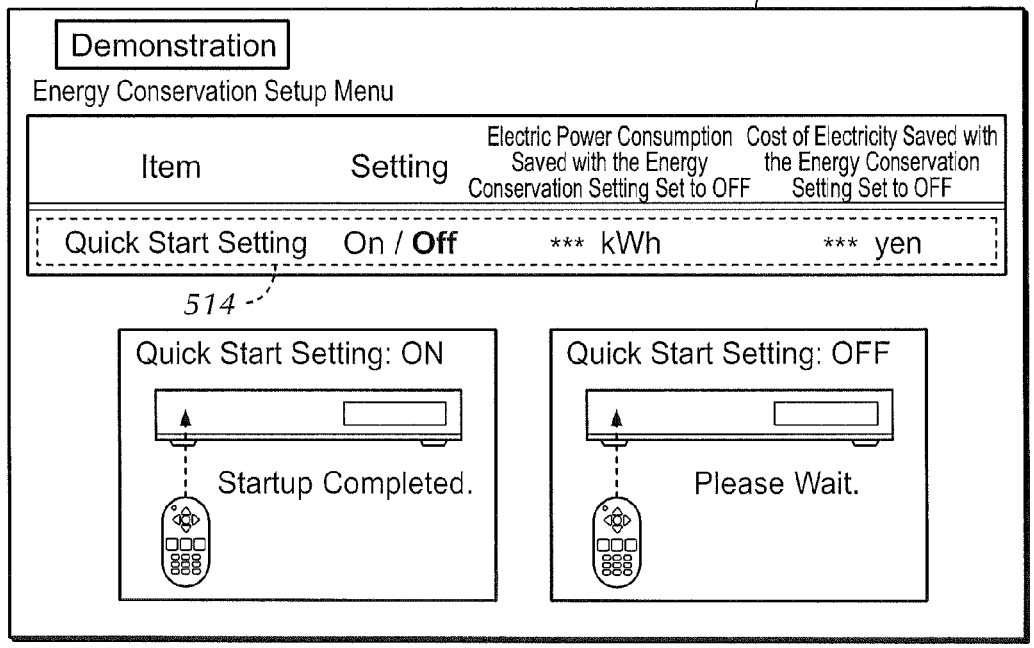
FIG. 18 is a diagram illustrating a displaying portion in a state wherein the demonstration has been completed with the quick start setting of the energy conservation setting of the BD recorder OFF in the receiving system according to one embodiment of the present invention.
Figure 19:
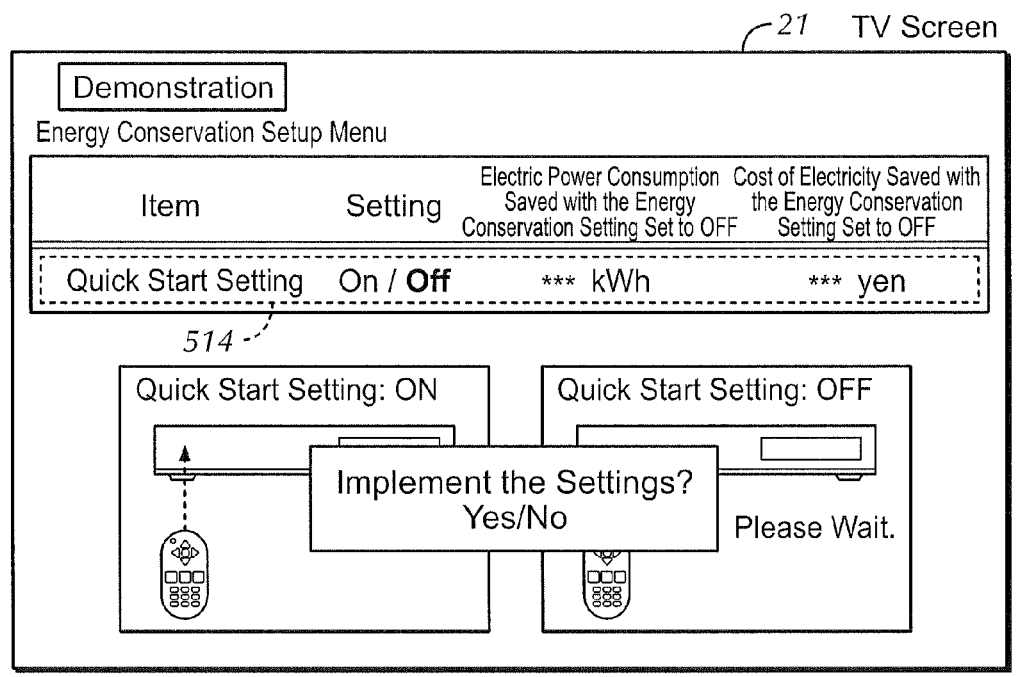
FIG. 19 is a diagram illustrating a query regarding whether or not to implement a quick start setting of the energy conservation setting of the BD recorder in the receiving system according to one embodiment of the present invention.

Moreover, when performing the energy conservation setup for the quick start, as illustrated in FIG. 16, the control unit 19 displays on the displaying portion 21 the state wherein the energy conservation setting for the quick start is turned ON and the state wherein the energy conservation setting for the quick start is turned OFF. As illustrated in FIG. 17 and FIG. 18, the control unit 19 performs a demonstration in a form that is displayed on the displaying portion 21, in the form of a movie, of the state wherein the setting that causes the quick start to be performed is switched to a setting wherein the quick start is not performed, when the energy conservation setting for the quick start is switched from ON to OFF by the user operating the remote control 3. As illustrated in FIG. 17 and FIG. 18, the state wherein the energy conservation setting for the quick start is turned OFF (when the quick start is not performed) is displayed on the right side of the displaying portion 21, and the state wherein the energy conservation setting for the quick start is turned ON (when the quick start is performed) is displayed on the left side of the displaying portion 21. Specifically, a comparison between a video of the operation of the BD recorder main unit 1a when the energy conservation setting for the quick start is ON and a video of the operation of the BD recorder main unit 1a when the energy conservation setting for the quick start is OFF is displayed.

Moreover, the configuration is such that control is performed so as to demonstrate, in a form that can be understood visually, the state wherein the energy conservation setting is implemented when performing the energy conservation setup for the optical disc operation settings.

Moreover, the control unit 19 is configured so as to perform control so as to display electric power consumption that would be saved, and information on the cost of electric power that would be saved, when displaying, on the displaying portion 21, the demonstration of the state wherein the energy conservation setup is implemented.

The control unit 19, as illustrated in FIG. 9, FIG. 12, FIG. 15, and FIG. 19, is structured so as to query the user as to whether or not to implement the energy setup after displaying on the displaying portion 21, through a demonstration, the state wherein the energy conservation setup has been implemented.

Figure 20:
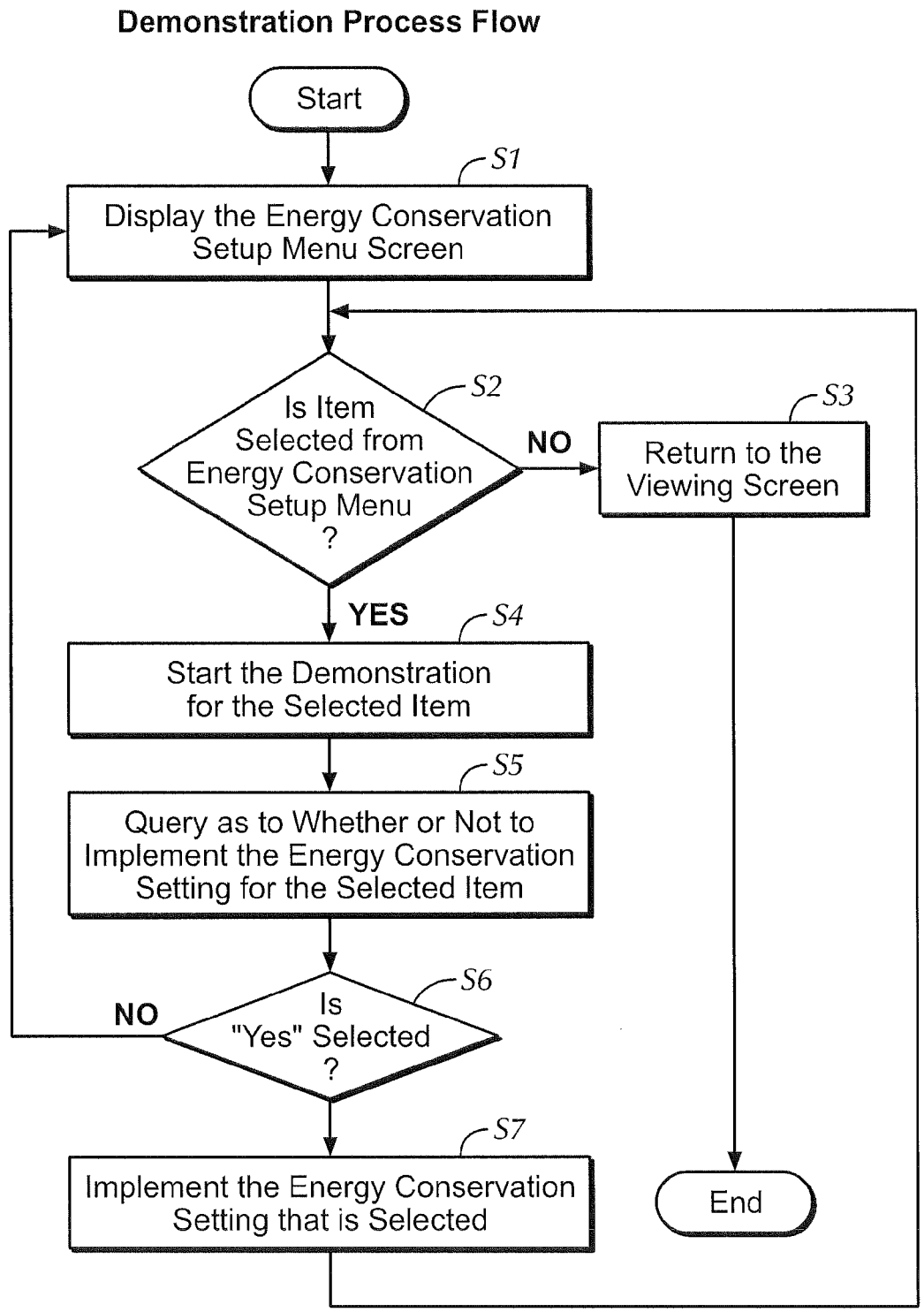
FIG. 20 is a flowchart for explaining the demonstration procedure in a receiving system according to one embodiment of the present invention.

The demonstration procedures that are executed by the control unit 19 in the BD recorder 1 in the receiving system 100 according to the present embodiment will be explained next in reference to FIG. 20. Note that the demonstration procedures are started through the selection of the Energy Conservation Setup menu in the Menu screen 211 or through the Energy Conservation Setup Menu button 35 on the remote control 3 being pressed by a user.

First, in Step S1, the Energy Conservation Setup Menu screen 212 is displayed. Following this, in Step S2, whether or not a specific item has been selected from the Energy Conservation Setup menu is evaluated. Specifically, whether or not an item has been selected by the user from among the items 511 through 515 (FIG. 4) is evaluated.

If, in Step S2, no specific item has been selected, then processing advances to step S3, returning to the viewing screen. Specifically, if the Back button 36 of the remote control 3 has been pressed by the user, processing returns to the viewing screen. Thereafter, the demonstration procedure flow is terminated. If, in Step S2, a specific item has been selected, then processing advances to Step S4.

In Step S4, the demonstration for the item that has been selected is started. If, for example, the antenna-through output setting (item 511) was selected, then, as illustrated in FIG. 10, a screen of the state wherein the energy conservation setting for the antenna-through output is ON is displayed on the displaying portion 21. Following this, as illustrated in FIG. 11, if the user sets the energy conservation setting for the antenna-through output to OFF, then a demonstration is performed in a form wherein a screen of the state wherein the energy conservation setting for the antenna-through output has been turned OFF is displayed on the displaying portion 21. Moreover, if, in Step S2, rather than the antenna-through output setting, the LCD setting, the attenuator power setting, the quick start setting, or the optical disc operation setting of the BD recorder 1 was selected, a similar procedure would be performed in Step S4.

Figure 12:
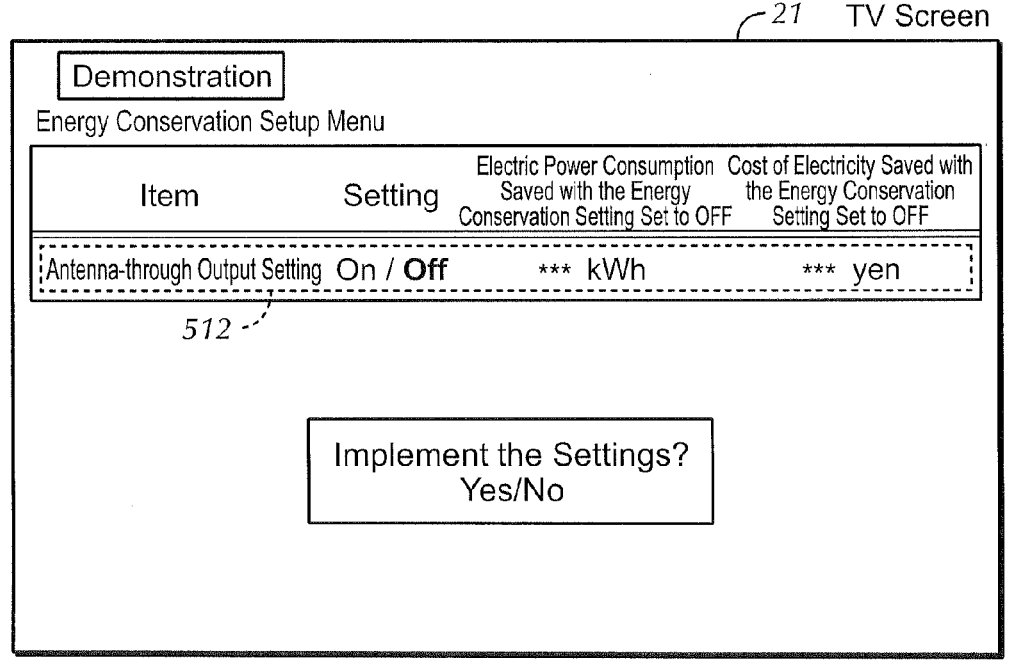
FIG. 12 is a diagram illustrating a query regarding whether or not to implement an antenna-through output setting of the energy conservation setting of the BD recorder in the receiving system according to one embodiment of the present invention.

Following this, in Step S5, a query as to whether or not to implement the energy conservation setting for the selected item is performed. For example, in the case wherein the attenuator-through output setting (item 512) was selected in Step S2, then, after the display of the screen of the state wherein the energy conservation setting for the attenuator-through output has been set to OFF, then, as illustrated in FIG. 12, a query is performed as to whether or not to implement the energy conservation setup wherein the energy conservation setting for the antenna-through output is set to OFF. Moreover, if, in Step S2, there was a selection for the LCD setting (item 511), the attenuator power setting (item 513), the quick start setting (item 514), or the optical disc setting (item 515) of the BD recorder 1, then, after displaying a screen of the state wherein the energy conservation setting corresponding to the selected item has been turned OFF (FIG. 9, FIG. 15, and FIG. 19), a query is performed as to whether or not to implement the energy conservation setting.

Following this, processing advances to step S6, and an evaluation is performed as to whether or not "Okay" has been selected. If "Okay" has not been selected in Step S6, then processing advances to step S1. If "Okay" has been selected in Step S6, then processing advances to Step S7, and the selected energy conservation setting is implemented. The flow of the demonstration procedure is then terminated.

In the present embodiment, as described above, a control unit 19 is provided for performing control so as to demonstrate, in a form that can be understood visually, a state wherein an energy conservation setup has been implemented, through either displaying on the displaying portion 21 or through operating the BD recorder 1, when an operation pertaining to the energy conservation setup of the BD recorder main unit 1a has been received from a user. Doing so makes it possible to envision easily, through the demonstration, the state wherein the energy conservation setup has been implemented, thus making it possible for the user to understand the energy conservation setup, making it possible to perform the energy conservation setup after understanding the state after the energy conservation setup. As a result, it is possible to prevent problems or misunderstandings of the BD recorder main unit 1a wherein a deleterious effect would appear in the BD recorder of the main unit 1a due to the energy conservation setup. Moreover, because a demonstration of the state wherein the energy conservation setup has been implemented is either displayed on the TV device 2 or performed in the BD recorder 1, the user is able to understand the energy conservation settings easily.

In the present embodiment, the control unit 19 is configured so as to query the user as to whether or not to implement the energy conservation setup after the state wherein the energy conservation setup has been implemented has been displayed on the displaying portion 21 through a demonstration. This enables the user to respond to the query as to whether or not to implement the energy conservation setup after confirming visually, through the demonstration, the state wherein the energy conservation setup has been implemented.

In the present embodiment, the control unit 19 is configured so as to perform control so as to demonstrate, in a form that can be understood visually, the states wherein energy conservation settings have been implemented individually for the individual items 511 through 515 of the plurality of items, which are functions wherein energy conservation settings can be set for a plurality of items in the energy conservation setup. Doing so enables the user to perform the energy conservation settings for each of the individual items based on an understanding of the individual items.

As described above, in the present embodiment an external displaying portion 21 is provided connected to the BD recorder main unit 1a, and the control unit 19 is configured so as to display, on the displaying portion 21, an Energy Conservation Setup Menu screen 212 that includes, as a group, a plurality of items, and so as to perform control so as to display on the displaying portion 21, through demonstrations, the states wherein the energy conservation settings for items selected from the plurality of items displayed in the Energy Conservation Setup Menu screen 212 have been implemented. Doing so enables the selection of desired items from the plurality of items that are displayed as a group on the external displaying portion 21 that is connected to the BD recorder main unit 1a, thus enabling improved operability when performing the energy conservation setup. Moreover, this enables the display of a demonstration, on the external displaying portion 21 that is connected to the BD recorder main unit 1a, of the state wherein the energy conservation setup has been implemented, thus enabling the user to easily understand visually the energy conservation setup.

In the present embodiment, as described above, the control unit 19 is configured so as to perform control so as to display on the displaying portion 21 information regarding the amount of electric power consumption that would be saved when the individual energy conservation settings for the respective items are implemented when displaying on the displaying portion 21 the Energy Conservation Setup Menu screen 212 that includes the plurality of items as a group. Doing so enables the effect of saving power to be increased easily through selecting the items wherein the amount of electric power consumption that would be saved is large while comparing the plurality of items using the Energy Conservation Setup Menu screen 212.

In the present embodiment, as described above, a remote control 3 is configured so as to provide an Energy Conservation Setup Menu button 35 for switching to the Energy Conservation Setup Menu screen 212, the BD recorder main unit 1a is configured so as to provide a remote control sensor 17 that is able to receive a signal from the remote control 3, and the control unit 19 is configured so as to perform control so as to switch the screen that is displayed on the displaying portion to the Energy Conservation Setup Menu screen 212 when the remote control sensor 17 receives a signal when the Energy Conservation Setup Menu button 35 has been pressed by a user. Doing so enables the Energy Conservation Setup Menu screen 212 to be displayed on the displaying portion through merely the Energy Conservation Setup Menu button 35 of the remote control 3 having been pressed, thus enabling an increase in operability (convenience) when performing the energy conservation setup.

In the present embodiment, as described above, the control unit 19 is configured so as to perform control so as to display information on the electric power consumption that would be saved, and the cost of electric power that would be saved, when an energy conservation setup has been implemented when displaying on the displaying portion 21, through a demonstration, the state wherein an energy conservation setup has been implemented. Doing so enables information pertaining to the amount of electric power consumption that would be saved, and the cost of electric power that would be saved, when an energy conservation setup is implemented to be understood easily while confirming, through a demonstration, the state wherein the energy conservation setup has been implemented.

In the present embodiment, as described above, an external displaying portion 21 is connected to the BD recorder main unit 1a, the BD recorder main unit 1a is configured so as to be provided with an LCD 16 that is able to display information regarding the BD recorder main unit 1a, and the control unit 19 is configured so as to perform control so as to demonstrate, in a form that can be understood visually, the state wherein an energy conservation setup has been implemented, using the LCD 16, while displaying a setup screen for the energy conservation setup of the LCD 16 on the external displaying portion 21. This provides a demonstration of after the energy conservation setup, using the LCD 16 itself, when performing an energy conservation setup of the LCD 16, thus enabling the user to envision easily the state of the energy conservation setup, resulting in the ability to understand even more easily the state after the energy conservation setup.

Note that the embodiment disclosed in this disclosure should be considered in all points to be illustrative, rather than constraining. The scope of the present invention is indicated by the Scope of Patent Claims, rather than by the explanations of the embodiment set forth above, and includes all meanings that are equivalent to the Scope of Patent Claims and all modifications or alterations within said Scope.

While in the embodiment set forth above an example was illustrated in application to a BD recorder as one example of an electronic device and receiving device according to the present invention, the present invention is not limited thereto. In the present invention, the present invention may be applied to electronic devices other than BD recorders. For example, the present invention may be applied to electronic devices such as TV devices and STBs (set-top boxes), and so forth.

While in the embodiment set forth above an example was presented wherein energy conservation settings were implemented individually for individual items 511 through 515 of a plurality of items, the present invention is not limited thereto. In the present invention, the implementation of the energy conservation settings may be as a group for the individual items 511 through 515.

While in the embodiment set forth above an example was presented wherein a demonstration was performed in a form that can be understood visually for a state wherein the energy conservation setup was implemented in a case wherein an energy conservation setup was performed for a BD recorder main unit 1a as a device main unit in the present invention, the present invention is not limited thereto. In the present invention, the demonstration may be performed for a state wherein the energy conservation setup is implemented, in a form that can be understood audibly, in addition to being in a form that can be understood visually.

While in the embodiment set forth above an example was presented wherein an Energy Conservation Display Menu screen was displayed on a TV device as an external displaying portion in the present invention, connected to the BD recorder, as the device main unit in the present invention, the present invention is not limited thereto. Rather, in the present invention the Energy Conservation Display Menu screen may be displayed on a displaying portion that is included within the equipment main unit portion.

While in the embodiment set forth above an example was presented wherein both the electric energy consumption that would be saved and information on the cost of the electricity that would be saved were displayed when the Energy Conservation Setup Menu screen was displayed on the displaying portion, the present invention is not limited thereto. In the present invention, instead only one of these, that is, the electric power consumption that would be saved or information on cost of the electricity that would be saved may be displayed when the Energy Conservation Setup Menu screen is displayed on the displaying portion.

While in the embodiment set forth above an example was presented wherein both the electric power consumption that would be saved and information on the cost of the electricity that would be saved were displayed when displaying on the displaying portion, through a demonstration, the state wherein the energy conservation setup has been implemented, the present invention is not limited thereto. Instead, in the present invention, only one, that is, the electric power consumption that would be saved or information on the cost of the electricity that would be saved, may be displayed when displaying on the displaying portion, through a demonstration, the state wherein the energy conservation setup has been implemented.

While in the embodiment set forth above an example was presented wherein the state wherein an energy conservation setup has been implemented using an LCD was demonstrated while displaying a setup screen for the energy conservation settings for the LCD as an information displaying portion of the present invention on an external displaying portion, the present invention is not limited thereto. In the present invention, the state wherein the energy conservation setup for the information displaying portion has been implemented may be displayed, in a form that can be understood visually and the setup screen for the energy conservation setup for the information displaying portion may be displayed as well, on the external displaying portion.

While in the embodiment set forth above an example was presented wherein energy conservation settings were implemented for an LCD (information displaying portion), an antenna-through output, an attenuator power supply, a quick start, and an optical disc operation of a BD recorder (an electronic device and receiving device), the present invention is not limited thereto. In the present invention, energy conservation settings may be implemented for other than that which is listed above.

While in the embodiment set forth above, for convenience in explanation, the explanation used a flow chart wherein the start of the procedure operations in the control unit was written as being event-driven and the procedure operations after the start were written as being flow-driven, the present invention is not limited thereto. The procedure operations in the control unit may be performed entirely in an event-driven form, may be performed entirely in a flow-driven form, or may be performed as parallel procedures.

EXPLANATION OF REFERENCE NUMERALS

1: BD Recorder (Electronic Device, Receiving Device)
1a: BD Recorder Main Unit (Device main unit, Receiving Device main unit)
2: TV Device (External Display Device)
3: Remote Control
11: Tuner (Receiving Portion)
16: LCD (Information Displaying Portion)
17: Remote Control Sensor
18: Outputting Portion
19: Control Unit
21: Displaying Portion (External Displaying Portion)
35: Energy Conservation Setup Menu Button
100: Receiving System
212: Energy Conservation Setup Menu Screen
511, 512, 513, 514, 515: Items

What is claimed is:
1. An electronic device comprising:
a device main unit; and
a controller that displays, on a display, visual demonstration of an energy setting of the device main unit, wherein
the controller displays, before receiving an operation that enables the energy setting, a state of the device main unit in which the energy setting is enabled, the controller displays, on the display, an energy setup showing a plurality of energy settings of the device main unit, and when one of the plurality of the energy settings is selected, the controller displays both the energy setup showing the selected energy setting, and the visual demonstration.

2. The electronic device as set forth in claim 1, wherein the controller displays the energy setup showing the selected energy setting to overlap with the visual demonstration.

3. The electronic device as set forth in claim 1, wherein the controller displays the energy setup showing the selected energy setting on an upper side of the display.

4. The electronic device as set forth in claim 1, wherein an area on the display where the visual demonstration is displayed is larger than an area on the display where the energy setup showing the selected energy setting is displayed.

5. The electronic device as set forth in claim 1, wherein the energy setup showing the selected energy setting further shows:
 a name of the selected energy setting, and
 at least one of: an on/off state of whether the selected energy setting is enabled, electric power to be consumed in the on/off state, and cost of the electric power.

6. The electronic device as set forth in claim 1, wherein the energy setup shows any of: an information displaying portion setting of the device main unit, an antenna-through output setting, an attenuator power setting, a quick start setting, and an optical disk operation setting.

7. The electronic device as set forth in claim 6, wherein when the information displaying portion setting is selected from the energy setup and is set to on, the controller displays a state of the device main unit in which the information displaying portion displays information.

8. The electronic device as set forth in claim 7, wherein when the information displaying portion setting is selected from the energy setup and is set to off, the controller displays a state of the device main unit in which the information displaying portion is turned off.

9. The electronic device as set forth in claim 6, wherein when the antenna-through output setting is selected from the energy setup and is set to on, the controller displays a state of the device main unit in which video of a TV broadcast is displayed.

10. The electronic device as set forth in claim 9, wherein when the antenna-through output setting is selected from the energy setup and is set to off, the controller displays a state of the device main unit in which the video is not displayed.

11. The electronic device as set forth in claim 6, wherein when the attenuator power setting is selected from the energy setup and is set to on, the controller displays a state of the device main unit in which video of a TV broadcast is displayed in clear focus.

12. The electronic device as set forth in claim 11, wherein when the attenuator power setting is selected from the energy setup and is set to off, the controller displays a state of the device main unit in which the video is not displayed in clear focus.

13. The electronic device as set forth in claim 6, wherein when the attenuator power setting is selected from the energy conservation setup, the controller displays an electric field strength on the display.

14. The electronic device as set forth in claim 6, wherein when the quick start setting is selected from the energy conservation setup, the controller simultaneously displays both:
 a first movie showing a start-up sequence of the electronic device when the quick start setting is enabled, and
 a second movie showing the start-up sequence when the quick start setting is disabled.

15. The electronic device as set forth in claim 1, wherein the controller displays an indicator indicating that the visual demonstration is being displayed.

16. The electronic device as set forth in claim 2, wherein the controller displays the energy setup showing the selected energy setting on an upper side of the display.

17. The electronic device as set forth in claim 2, wherein an area on the display where the visual demonstration is displayed is larger than an area on the display where the energy setup showing the selected energy setting is displayed.

18. The electronic device as set forth in claim 16, wherein an area on the display where the visual demonstration is displayed is larger than an area on the display where the energy setup showing the selected energy setting is displayed.

19. The electronic device as set forth in claim 1, wherein the controller displays, in response to receiving the operation that selects one of two options that enables the energy setting, the state of the device main unit in which the energy setting is enabled.

\* \* \* \* \*